United States Patent [19]
Jones et al.

[11] 3,833,277
[45] Sept. 3, 1974

[54] BEARING ASSEMBLY WITH VENT MEANS IN THE BEARING THEREOF

[75] Inventors: Harry M. Jones, Canton; Dale T. Grinstead, North Canton; Jack O. Fickes, Dover, all of Ohio

[73] Assignee: The Timken Company, Canton, Ohio

[22] Filed: Jan. 12, 1973

[21] Appl. No.: 323,057

[52] U.S. Cl. ............................................. 308/180
[51] Int. Cl. ........................................... F16c 35/04
[58] Field of Search ............................. 308/187, 180

[56] References Cited
UNITED STATES PATENTS
| | | | |
|---|---|---|---|
| 3,572,379 | 2/1969 | Popa et al. ........................... | 308/187 |
| 3,603,655 | 9/1971 | Keller .................................... | 1/180 |

*Primary Examiner*—Charles J. Myhre
*Assistant Examiner*—Frank Susko
*Attorney, Agent, or Firm*—Gravely, Lieder & Woodruff

[57] ABSTRACT

A double row tapered roller bearing has a double cup provided with a vent fitting between the raceways thereof, and a portion of this vent projects inwardly beyond the inner surface of the cup to prevent grease from entering the vent fitting if the bearing cup turns such that the vent fitting is at the bottom thereof. Thus, the bearing is vented between the two raceways thereof and this minimizes the chances of the vent passageway becoming obstructed with hardened grease. The bearing is held on an axle journal by an end cap having a triangular rib, and the size of the bearing is embossed on each leg of the rib so that the size is clearly legible irrespective of the angular position of the end cap.

16 Claims, 4 Drawing Figures

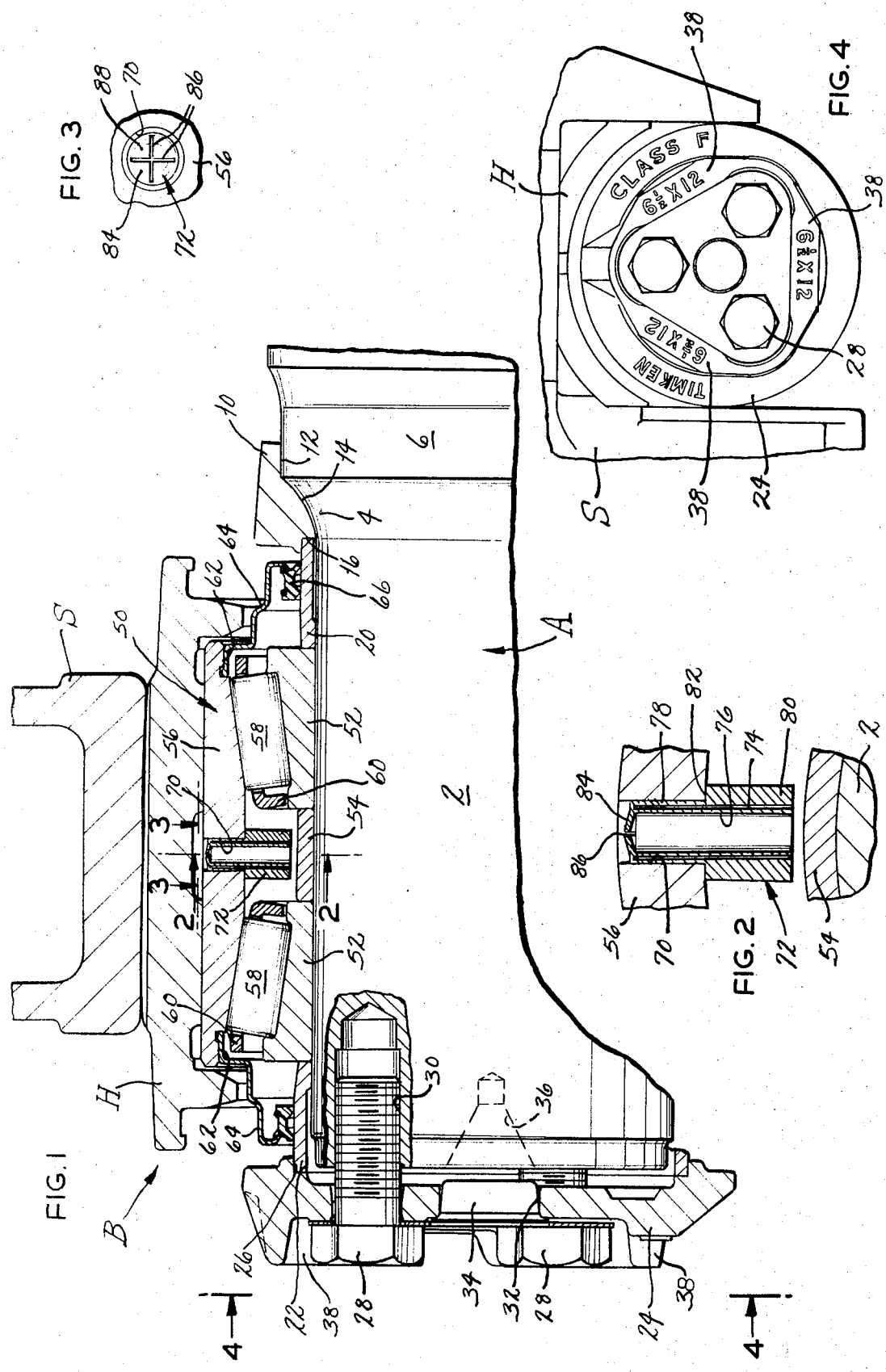

BEARING ASSEMBLY WITH VENT MEANS IN THE BEARING THEREOF

BACKGROUND OF THE INVENTION

This invention relates to bearing assemblies and more particularly to a bearing assembly provided with novel venting means.

Tapered roller bearings have been used quite extensively in the trucks of rail cars as replacements for the old sleeve type journal bearings which had a tendency to burn off. The typical tapered roller bearing assembly fits over the journal at the end of the rail car axle and in turn is fitted into an adapter or housing which is received in the side frame of the rail car truck. The bearing assembly itself includes a tapered roller bearing which is clamped between a pair of wear rings. The inboard wear ring fits against a backing ring which is seated against a fillet at the inner end of the axle journal, while the outboard wear ring fits against an end cap which is bolted to the outer end of the axle journal. Actually, only the cones and a spacer of the tapered roller bearing are clamped between the wear rings. The cup fits into the adapter and carries seals which embrace the wear rings to exclude contaminants from the interior of the bearing and retain grease within the bearing.

Conventional bearing assemblies of the foregoing construction are lubricated through their end caps. More specifically, the grease is forced into the space between the end face of the axle journal and end cap and from that space flows through a narrow annular passageway between the outboard wear ring and the journal. At the end of the passageway the grease enters the bearing through apertures in the wear ring. As the bearing fills with grease, the displaced air leaves through apertures in the inboard wear ring and thereupon flows through a narrow annular passageway between the inboard wear ring and the journal. This passageway opens into another narrow passage between the backing ring and the fillet at the end of the journal, and that passage in turn opens into a vent fitting. Should the bearing receive too much grease, the excess will be forced into the narrow passageways underlying the inboard wear ring and the backing ring, and may even flow into and through the vent fitting.

The grease in the annular passageway underlying the inboard wear ring and the backing ring has a tendency to harden and obstruct the passageways rendering the vent ineffective. This occurs when the oil bleeds out of the grease leaving a soap deposit called hardened grease. With the vent ineffective, the bearing is vented through the seals, and this is undesirable since it distorts the seals and forces grease from the bearing.

SUMMARY OF THE INVENTION

One of the principal objects of the present invention is to provide a bearing assembly having vent means positioned such that lubricants from the bearing do not tend to obstruct it. Another object is to provide a bearing assembly adapted to operate for extended periods of time without relubrication. A further object is to provide a bearing assembly having a vent located away from the direction in which the bearing tends to pump lubricants. An additional object is to provide a bearing assembly which does not have narrow passageways which have a tendency to become obstructed by hardened grease. Still another object is to provide a bearing assembly, the bearing of which is prelubricated with the prescribed amount of grease. Yet another object is to provide a bearing assembly, the size markings of which are legible on the end cap thereof irrespective of the angular position of the end cap. These and other objects and advantages will become apparent hereinafter.

The present invention is embodied in a bearing assembly including a backing ring, at one end, an end cap at the other end, wear rings adjacent to the end cap and backing ring and a bearing between the two wear rings. The bearings have inner and outer races and two rows of rolling elements between races. The outer race has a vent which is located between the two rows of rolling elements. The invention also resides in the bearing itself. The invention also consists in the parts and in the arrangement and combinations of parts thereinafter described and claimed.

DESCRIPTION OF THE DRAWINGS

In the accompanying drawings which form part of the specification and wherein like numerals and letters refer to like parts wherever they occur:

FIG. 1 is a fragmentary sectional view of a bearing assembly constructed in accordance with and embodying the present invention;

FIG. 2 is a sectional view taken along line 2—2 of FIG. 1 and showing the vent fitting;

FIG. 3 is a top plan view of the vent fitting; and

FIG. 4 is an end view of the bearing assembly showing the end cap thereof.

DETAILED DESCRIPTION

Referring now to the drawings, B designates a bearing assembly which is interposed between a rail car axle A and an adapter or housing H received in the side frame of a rail car truck. The axle A (FIG. 1) has a journal 2 at its end, and this journal inwardly terminates at an axle fillet 4 which in effect is an arcuate shoulder. The axle A also has a machined cylindrical surface 6 located adjacent the axle fillet 4.

The bearing assembly B (FIG. 1) includes a backing ring 10 which fits over the axle journal 2 and has an enlarged bore 12 at its one end. The enlarged bore 12 is sized for an interference fit with the machined cylindrical surface 6 and merges into an arcuate surface 14, the contour of which corresponds to that of the axle fillet 4. Beyond the arcuate surface 14, the backing ring 10 is provided with a cylindrical socket 16 which opens out of the backing ring 10 in the opposite direction. The backing ring 10 is passed over the axle journal 2 with the enlarged bore 12 presented toward the axle fillet 4. Once the axle fillet 4 engages the enlarged bore 12, the backing ring 10 is press-fitted over the cylindrical surface 6 until the arcuate surface 14 seats against the axle fillet 4. The press fit holds the backing ring 10 firmly in place and prevents fretting along the cylindrical surface 6 and the axle fillet 4.

Fitted into the cylindrical socket 16 which opens out of the one end of the backing ing 10 is an inboard wear ring 20. The wear ring 20 fits snugly around the journal at its end located remote from the backing ring 10 and in appearance resembles a conventional wear ring. It does not, however, have vent apertures as do conventional wear rings and is therefore imperforate.

At the opposite end of the bearing assembly B an outboard wear ring 22 encircles the axle journal 2, and this wear ring is identical to the inboard wear ring 20, but is reversed in position. Hence, it snugly embraces the axle journal 2 at its end located furthest inwardly.

The outboard wear ring 22 extends slightly beyond the end of the axle journal 2 where it is received in an end cap 24 (FIG. 1). In particular, the end cap 24 has a cylindrical socket 26 which opens toward the outboard wear ring 22 and the outer end of the wear ring 22 projects into the socket 26. The end cap 24 is held in place by three cap screws 28 which extend through it and thread into holes 30 in the axle journal 2. At its center the end cap 24 is provided with an opening 32 which is normally closed by a plastic plug 34 press fitted into it. This opening is located directly in front of the conical center hole 36 in the axle A. Thus, when the plug 34 is removed, the center hole 36 is exposed and the entire axle A may be supported between the center holes 36 in each end without removing the bearing assembly B and the end cap 24 on each end. In this connection, it should be noted that the opening 32 should be large enought to accommodate a lathe center enough is typically 1½ inches in diameter. A diameter of 1 11/16 inches is suitable for the opening 32. The end cap 24 is also provided with a triangular rib 38 (FIG. 4) on its outwardly presented end face, and this rib has the size of the bearing assembly B embossed on each of the three legs thereof in large letters and numerals. This provides an extra measure of safety against the wrong size bearing assembly B being installed on the axle journal 2, since the size is clearly legible in any position of rotation that the bearing assembly B may assume.

Interposed between the inboard and outboard wear rings 20 and 22 and likewise encircling the journal 2 of the axle A is a double row tapered roller bearing 50 (FIG. 1) which is also received in the adapter H to serve as an anti-friction bearing between the side frame S and axle journal 2. The bearing 50 includes a pair of cones 52 which are separated by a spacer 54, and the cones 52 and the spacer 54 are all clamped together between the two wear rings 20 and 22 which abut against the back faces of those cones 52. The bearing 50 also includes a double cup 56 which encircles the cones 52 and spacer 54. The cup 56 and cones 52 have opposed tapered raceways which are oriented such that their large diameter ends are presented outwardly. Fitted between the raceways of the cup 56 and cones 52 are tapered rollers 58. The rollers 58 are arranged in two rows and the rollers 58 of the two rows are properly spaced by cages 60. At its ends the double cup 56 has outwardly opening counterbores 62.

Inserted into the counterbores 62 of the double cup 56 are seal cases 64 which project outwardly from the bearing 50 and circumscribe the wear rings 20 and 22. To improve retention of the seal case 64, an adhesive may be used within the counterbores 62, that is between the opposed surfaces of the counterbores 62 and seal cases 64. The seal cases 64 have elastomeric lip seals 66 bonded to them and the lips of these seals embrace the wear rings 20 and 22 and form a barrier at the ends of the bearing 50 for excluding contaminants from the interior thereof and for retaining grease within the bearing 50.

Midway between its ends the double cup 56 is provided with a radial bore 70 (FIG. 1) in which a vent fitting 72 is installed. The bore 70 has its inner end at an intervening surface located between the two inwardly presented tapered raceways of the cup 56, and positions the fitting 72 immediately outwardly from the spacer 54 of the bearing 50. The vent fitting 72 (FIG. 2) includes a steel sleeve 74 which extends substantially the entire length thereof, and bonded to the inwardly presented surface of the sleeve 74 is an elastomeric inner liner 76. On its outside surface the sleeve 74 has an elastomeric covering 78 bonded to it, and the covering is sized to fit snugly in the radial bore 70. Indeed, the covering 78 is slightly larger in diameter than the bore 70 so that it will be deformed upon installation in the bore and will thereby retain the vent fitting 72 tightly in the bore 70. The covering 78 merges into an enlarged elastomeric portion 80 at a shoulder 82, which is positioned against the inside surface of the cup 56.

At the outermost end of the steel sleeve 74, both the elastomeric liner 76 and covering 78 merge into a slightly conical closure wall 84 which extends completely across the outer end of the steel sleeve 74 and is oriented such that its apex is directed outwardly. The closure wall 84 is provided with slits 86 (FIG. 3) which intersect at 90° angles and divide the wall 84 into four segments 88 which can flex relative to one another to equalize the pressure on each side of the wall 84. A pressure build-up would otherwise occur within the bearing 50 since the bearing 50 generates heat in operation. Preferably, the slits 86 are formed by inserting a hot knife through the wall 84 and leaving the knife in the wall 84 long enough to overcure the elastomer at the edges of the slits 86. Such a procedure is described in greater detail in U.S. Pat. No. 3,572,379. The overcure prevents the elastomer from rebonding across the slits 86.

The bearing assembly B is sold as an assembled unit with the bearing 50 thereof prelubricated at the factory. This insures that the bearing 50 has the proper amount of grease in it. The bearing assembly B is installed on the axle journal 2 in the customary manner, with single exception that the backing ring 10 must be press fitted over the cylindrical surface 6 at the end of the axle journal 2. When the axle A having the bearing assembly B thereon is installed in the side frame S of a rail car truck, the cup 56 is positioned such that the vent fitting 72 is at the top thereof.

In use, the bearing assembly B connects the axle A with the adapter or housing H in the side frame S, and the bearing 50 of the bearing assembly B reduces friction to a bare minimum. The vent fitting 72 causes the pressure in the bearing to equalize with the exterior pressure which prevents interior pressure on the two seals 66. Since the vent fitting 72 is normally positioned uppermost, the grease will not enter and obstruct it. Moreover, should cup 56 turn in the adapter or housing H, as is sometimes the case with lightly loaded rail cars, the vent fitting 72 projects far enough into the interior of the bearing 50 to remain above the lubricant level, even when the vent fitting 72 is at the very bottom of the cup 56 and the grease is liquified. In other words, the inwardly projected portion of the vent fitting 72 serves as a standpipe. Hence, the interior of the vent fitting 72 never fills with grease, so grease cannot harden in the interior of it and obstruct it. In this connection, it should be recognized that the bearing 50 is prelubricated at the factory and cannot be lubricated in service as is true of conventional bearing assemblies. Consequently, the bearing 50 always contains the prescribed amount of grease and is never over filled to the extent that the lip seals 66 are turned outwardly and the vent fitting 72 is obstructed. Aside from the foregoing, the geometry of a tapered roller bearing is such that it pumps lubricant toward the large diameter ends of the tapered rollers 58. Thus, the vent fitting 72 is located away from the direction in which the bearing 50 pumps the grease, and this further minimizes the chances of obstructing the vent fitting 72. Finally, it should be recognized that the venting passage through the vent fitting 72 is quite short, and that the venting passage contains no sharp turns or restrictions of extended length where the lubricant may lodge and harden as is the case with conventional bearing assemblies.

With respect to the end cap 24 of the bearing assembly B, the plastic plug 34 therein may be easily removed to expose the conical center hole 36 in the axle A. Thus, the entire axle A may be supported between centers without removing the bearing assembly B or its end cap 24, so that wheels on the axle A can be turned down with minimum inconvenience. Also, the end cap 24 has the size of the bearing assembly B embossed on each of the triangular ribs 38 projecting from its front face (FIG. 4). Thus, irrespective of the position of the end cap 24, the size of the bearing assembly B is clearly legible, and this minimizes the chances of the bearing assembly B being installed on the wrong size axles.

This invention is intended to cover all changes and modifications of the example of the invention herein chosen for purposes of the disclosure which do not constitute departures from the spirit and scope of the invention.

What is claimed is:

1. A bearing comprising: a unitary outer race having a pair of inwardly presented raceways thereon and an intervening surface separating the raceways, the outer race further having an aperture extending completely through it in the radial direction with the inner end of the aperture being at the intervening surface; inner race means positioned within the outer race and having a pair of raceways located opposite the pair of raceways on the outer race; rolling elements arranged in two circumferential rows located between the opposed raceways of the inner race means and the outer race; and a tubular vent fitting installed firmly in the aperture and oriented generally radially with respect to the axis of rotation for the bearing, the outer end of the tubular vent fitting being disposed within the aperture and the inner end being located radially inwardly from the intervening surface between the two raceways on the outer race, whereby a portion of the vent fitting projects radially inwardly from the intervening surface, said portion of the vent fitting being substantially imperforate so that a lubricant in the bearing will not flow into the vent fitting if the vent fitting is at the bottom of the bearing, the vent fitting allowing fluid to flow from its inner end out of its outer end so that excessively high pressures will not develop in the interior of the bearing.

2. A bearing according to claim 13 wherein the vent fitting includes a closure which is normally closed but can open to equalize the pressure on each side thereof so as to vent the interior of the bearing.

3. A bearing according to claim 2 wherein the closure is a wall formed from an elastomeric material and having at least one slit therein to divide the wall into segments which flex relative to each other.

4. A bearing according to claim 1 wherein the vent fitting includes an elastomeric closure wall extended across and normally closing the tubular fitting, the closure wall having two slits therein which divide the wall into segments which flex relative to one another to equalize the pressure on each side of the closure wall.

5. A bearing according to claim 4 wherein the raceways are tapered, the inner race means comprises a pair of cones, and the rolling elements are tapered rollers.

6. A bearing assembly for a shaft having a journal at the end thereof, said bearing assembly comprising: a backing ring positioned firmly at the innermost portion of the journal; an end cap fastened to and extended across the opposite end of the journal; a sealed bearing on the journal between the end cap and the backing ring, the bearing including a unitary outer race having two inwardly presented raceways and an intervening surface between the raceways; an inner race having outwardly presented raceways located opposite to the raceways on the outer race, rolling elements arranged in two circumferential rows between the inner and outer races and engaging the raceways, and a tubular vent in the outer race between the two raceways for venting the interior of the bearing, the vent projecting radially inwardly beyond the intervening surface and the raceways of the outer race and having substantially imperforate sidewalls inwardly from the intervening surface so that lubricants will not enter the vent if vent is located at the bottom of the outer race; an inboard wear ring encircling the journal between the backing ring and the inner race of the bearing, the inboard wear ring being imperforate and abutted tightly against the backing ring and inner race so that lubricants will not flow past the ends of the inboard wear ring; an outboard wear ring encircling the journal between the end cap and the inner race of the bearing, the outboard wear ring being imperforate and abutted tightly against the end cap and inner race so that lubricants will not flow past the ends of the outboard wear ring; and seal means carried by the outer race of the bearing at each end thereof and having elastomeric seal lips which embrace the wear rings and form a barrier to the passage of a lubricant along the wear rings.

7. A bearing assembly according to claim 6 wherein the backing ring is imperforate in the radial direction and is press fitted onto the shaft.

8. A bearing assembly according to claim 6 wherein the outer race of the bearing has a radial bore in it intermediate its two raceways and the vent is fitted into the bore, the vent being tubular and projecting inwardly beyond the inwardly presented surface of the outer race.

9. A bearing assembly according to claim 8 wherein the raceways of the outer and inner races are tapered, the inner race is segmented into a pair of cones on which the tapered raceways of the inner race exist, and the rolling elements are tapered rollers.

10. A bearing assembly according to claim 6 wherein the end cap has a triangular rib on its end face presented away from the axle, and the size of the bearing assembly appears on each leg of the rib, whereby the size of the bearing assembly is easily discernible irrespective of the position of the end cap.

11. The structure according to claim 6 wherein the shaft journal has a center hole opening out of the end thereof and the end cap has an opening aligned with the center hole to provide access thereto the opening being sized to accommodate a machine tool center so that the shaft can be mounted between centers.

12. A bearing according to claim 1 wherein the tubular vent fitting has a shoulder intermediate its ends, the shoulder being against the intervening surface.

13. A bearing according to claim 12 wherein the portion of the vent fitting disposed within the aperture has an elastomeric covering which is engaged with and compressed by the walls of the aperture.

14. A bearing according to claim 13 wherein the elastomeric covering is bonded to and covers a steel sleeve.

15. A bearing comprising: a unitary outer race having a pair of inwardly presented raceways thereon and an intervening surface between the raceways, the outer race further having a bore extending completely through it in the radial direction with the inner end of the bore being at the intervening surface; inner race means positioned within the outer race and having a pair of raceways located opposite the pair of raceways on the outer race; rolling elements arranged in two circumferential rows located between the opposed raceways of the inner race means and the outer race; and a tubular vent installed in the bore and oriented generally in the radial direction with respect to the axis of rotation for the bearing, the vent fitting including a rigid sleeve and an elastomeric covering surrounding the sleeve, the elastomeric covering being disposed within the bore and being compressed between the walls of the bore and the sleeve to snugly retain the vent fitting in the outer race, the vent fitting projecting radially inwardly beyond the intervening surface and the raceways of the outer race with the sidewalls thereof being substantially imperforate beyond the intervening surface so that a lubricant in the bearing will not flow into the vent fitting if the vent fitting is at the bottom of the bearing; the vent fitting having a shoulder intermediate its end and the shoulder being abutted against the intervening surface of the outer race, the vent fitting allowing fluid to flow from its inner end to its outer end so that excessively high pressures will not develop in the interior of the bearing.

16. A bearing according to claim 15 wherein the bore is of a single diameter and the outer end of the vent fitting is disposed entirely within the bore.

* * * * *

UNITED STATES PATENT OFFICE
CERTIFICATE OF CORRECTION

Patent No. 3,833,277          Dated September 3, 1974

Inventor(s) Harry M. Jones, et al

It is certified that error appears in the above-identified patent and that said Letters Patent are hereby corrected as shown below:

Column 3, line 23, "enought" should be --- enough ---;

line 24, cancel "enough" and insert --- which ---.

Column 5, Claim 2, line 62, the numeral "13" should be --- 1 ---.

Signed and sealed this 3rd day of December 1974.

(SEAL)
Attest:

McCOY M. GIBSON JR.
Attesting Officer

C. MARSHALL DANN
Commissioner of Patents